UNITED STATES PATENT OFFICE.

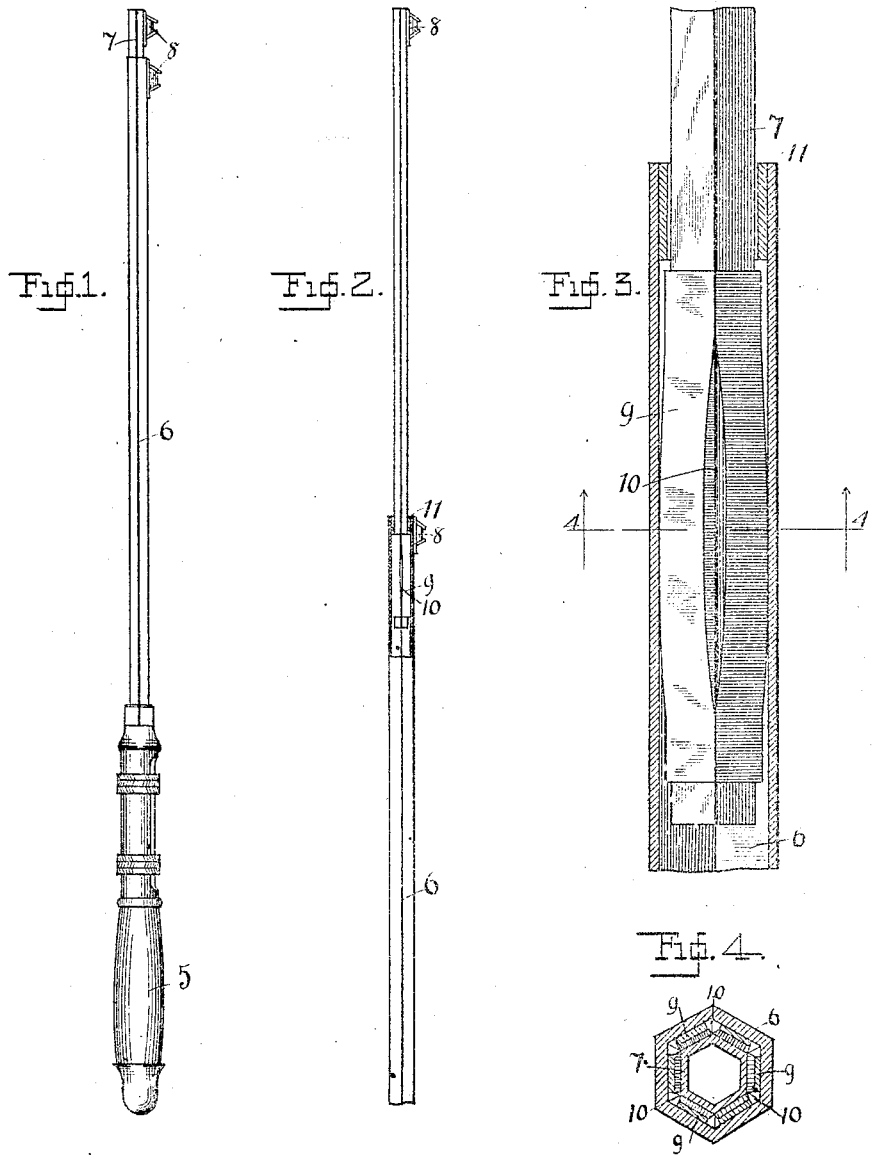

JOSEPH B. FISCHER, OF CHICAGO, ILLINOIS.

FISHING-ROD.

No. 912,552.

Specification of Letters Patent.

Patented Feb. 16, 1909.

Application filed July 27, 1906. Serial No. 328,011.

*To all whom it may concern:*

Be it known that I, JOSEPH B. FISCHER, citizen of the United States, residing at Chicago, in the county of Cook and State of Illinois, have invented certain new and useful Improvements in Fishing-Rods, of which the following is a specification.

This invention relates to improvements in fishing rods of the telescopic class, and the especial object of my improvements is to produce a fishing rod made up of a plurality of tubular joints or sections slidably and non-rotatably mounted relative to each other.

A further object is to provide a locking device between the sections whereby each piece will be held against accidental displacement in the position to which it is adjusted by the user.

A still further object is to produce a telescopic tubular fishing rod having a maximum degree of strength.

In the accompanying drawings which form a part of this application I have shown a preferred adaptation of my invention in the following views:—

Figure 1 is an elevational view of a fishing rod constructed according to my invention and collapsed; Fig. 2 is a view partly in section showing two joints of a rod with the locking device applied thereto; Fig. 3 is a section on an enlarged scale showing the application of the locking device, and Fig. 4 is a cross-section on the lines 4—4 of Fig. 3.

Referring to the details of the drawing, 5 represents a fishing rod handle which may be of any desired construction, and in which is secured one end of the first rod-joint 6. This joint and the others shown in the drawing are hexagonal in cross-section, but it will be understood that they may be square, pentagonal, octagonal or any other polygonal form.

7 represents a rod joint or section which is telescopically mounted in section 6. On one end of section 7 which is telescopically arranged in section 6, is secured by brazing or in any other suitable manner, a locking device which consists of a short piece of spring metal tubing 9 which is hexagonal in cross section and at its ends adapted to fit closely over the section 7. For a portion of the length of this spring tube sleeve it is cut or slit at its corners or angles to form longitudinal slots 10. These slots are enlarged by expanding the tongues or portions of the metal remaining between the slots. This expansion of the tongues causes them to bind on the adjacent walls of the section 6 with sufficient friction to lock the tube 7 in any adjustable position given it by the user of the rod. To prevent the possibility of the section 7 being entirely withdrawn from the section 6, I rigidly secure in the outer end of the latter a collar 11 which forms an abutment and stop for the locking spring sleeve 9.

It will be understood that as many slidable sections 7 may be assembled as may be desired, and that each section will have secured thereto a line guide 8, said guides being arranged on the several sections so as to be in the same alinement. It will be also understood that the section 6 is non-rotatably mounted in the handle 5 and hence it is impossible to rotate the other sections constructed and mounted as described.

While I have shown the spring locking sleeve as cut at each of its corners or bends it may not be necessary in all cases to cut the metal at all of said points, for if the spring metal is sufficiently thick and of the right temper two or three outwardly expanded spring tongues will be sufficient to effect the desired locking.

Having thus described my invention I claim:—

1. In a fishing rod, a plurality of telescopically mounted metal seamless tubular sections of polygonal shape in cross section, and means for interlocking said sections, consisting of a tubular spring sleeve secured to one end of each section and slidable in the outer section, said sleeve being of less diameter at its ends than the bore of the section in which it slides, and having its middle portion slotted longitudinally and expanded against the inner walls of the outer section.

2. In a fishing rod, a plurality of telescopically mounted metal seamless tubular sections of polygonal form in cross-section, and means for interlocking said sections, consisting of a seamless tubular spring sleeve secured at one end of each inner section and slidable in the outer section, said sleeve conforming in cross-section to the shape of the section to which it is secured with longitudinal openings extending between the ends, and having portions expanded to frictionally engage the inner walls of the outer section.

3. Locking means for telescopic rods, consisting of a seamless tubular sleeve of spring metal conforming in cross-section to the rod to which it is applied and provided with straight longitudinal slots extending throughout the greater part of said sleeve, and having the portions between said slots expanded laterally to frictionally engage the walls of the rod.

In testimony whereof I affix my signature in presence of two witnesses.

JOSEPH B. FISCHER.

Witnesses:
F. BENJAMIN,
M. A. MILORD.